UNITED STATES PATENT OFFICE 2,564,331

PREPARATION OF A COPRECIPITATED NICKEL-ZIRCONIUM CATALYST

Harold Kenneth Hawley, Cincinnati, Ohio, assignor to The Procter and Gamble Company, Ivorydale, Ohio, a corporation of Ohio No Drawing. Application July 7, 1947,
Serial No. 759,463

7 Claims. (Cl. 252—472)

This invention relates to hydrogenation catalysts, and more particularly to the preparation of highly active promoted nickel catalyst for use in the hydrogenation of carbon to carbon double bonds in unsaturated organic liquids.

It is well known that the activity of nickel as a catalyst is increased or promoted by association with relatively minor proportions of any one or more of a number of different metals or their oxides, including copper, chromium, cobalt, zirconium, and thorium.

In making promoted nickel catalyst a common practice is to add an aqueous solution of sodium carbonate to an aqueous solution containing both a soluble salt of nickel and a soluble salt of the promoter metal or metals, and then to filter, wash, and dry the resulting precipitate of nickel carbonate and promoter metal carbonate, and to reduce it by means of hydrogen at elevated temperature, either in dry condition or as a slurry in oil.

I have found that certain promoted nickel catalysts, for example nickel-zirconium catalyst, although somewhat more active than nickel alone when prepared in this way, may be prepared in a very much more active form by the process of the present invention. It is my belief, although I do not wish to be bound by any theory, that the conventional method of preparing such catalyst as described in the preceding paragraph fails to produce a catalyst of optimum activity from the materials employed because it does not precipitate the nickel carbonate and promoter metal carbonate simultaneously, and therefore does not obtain as intimate an association of the two as is possible. When the foregoing procedure is practiced, zirconium precipitates as a basic derivative from a solution of the sulfate at a pH range of about 2 to 4 whereas nickel similarly precipitates from a solution of its sulfate at about 4 to 6. The success of the method of the present invention is believed to depend upon securing a truer coprecipitation of the insoluble basic derivatives of the two metals.

The invention comprises forming initially a water-soluble carbonate complex of the promoter metal in an aqueous solution which contains a sufficient excess of carbonate radicals to form the carbonate of the subsequently added nickel as well as the carbonate of the already present promoter metal. A suitable way to accomplish this is to add carefully an aqueous solution of a soluble normal salt of zirconium, such as the sulfate or chloride, or of the hydrolysis product of a normal zirconium salt (including the corresponding zirconyl salts) to a solution of an alkali carbonate or bicarbonate containing a large excess of carbonate ions. Upon the gradual mixing of the resulting basic promoter metal solution with a solution of a water-soluble nickel salt, under suitable conditions as hereinafter described, there occurs a coprecipitation of nickel carbonate and promoter metal carbonate (and/or other basic derivatives of these metals, referred to herein simply as carbonates) such that a catalyst of greatly improved activity results, after the customary filtration, washing, drying, and dry reduction.

Objects of the invention are to provide a method of producing promoted nickel catalyst, particularly a nickel-zirconium catalyst, of superior activity as compared to that produced by earlier methods, to provide a method of producing in such a catalyst a predictable and dependable high activity particularly for use in hydrogenation practice at relatively low temperatures (60°–110° C.) and to provide a nickel-zirconium catalyst in a new form, decidedly more active by virtue of a more intimate association of its component.

The following typical examples will illustrate suitable methods of practicing the invention.

*Example 1.*—Three aqueous solutions are prepared, convenient concentrations of these being as follows:

I, an 8% solution of nickel, as the sulfate,
II, a 4% solution of zirconium, as the sulfate,
III, an 8% solution of sodium carbonate.

The amount of solution No. I which is used forms the basis for calculating the amounts of the other solutions to be used. For any given amount of solution No. I, I prefer to use enough of solution II to supply 15 parts by weight of zirconium for every 100 parts of nickel. I also prefer to use enough of solution III to supply 110% of the amount of carbonate theoretically required to precipitate all of the nickel and all of the zirconium.

In the practice of the invention in this example I bring 215.0 pounds of solution III to a temperature of about 70° to 100° F. and while agitating vigorously I gradually add, through a pipe leading well below the surface of solution III, 28.0 lbs. of solution II which has also been brought to about 70° to 100° F., taking 15 minutes for this operation. A basic zirconium derivative may tend to precipitate at first, but this quickly redissolves, particularly when the formation of large flocks is avoided, and a clear solution results.

This solution is gradually heated to 165° F., with mild agitation, and when this temperature is reached I start spraying solution No. I, also at about 165° F., onto its surface while agitating quite vigorously. I employ 92.7 pounds of solution No. I and add it at a uniform rate such that 90 minutes are required for this step.

I then allow the resulting precipitate to digest for 45 minutes at 165° F., under gentle agitation. It is then heated rapidly and boiled vigorously for 30 minutes. The slurry is then filtered and the press cake is washed with water at 180° F. until almost completely free from sulfate. The washed filter cake is dried and the dry cake is reduced in a stream of purified hydrogen at a temperature of about 260° to 350° C. until the material takes on the characteristic black color of reduced nickel catalyst.

The resulting catalyst has an activity value of 10 on an arbitrary scale, based on rate of hydrogenation of cottonseed oil at 100° C., as compared with an average activity of about 5 for comparable nickel-zirconium catalyst similarly prepared except that the carbonates were precipitated from a common solution of their sulfates as previously described.

*Example 2.*—Employing solutions II and III of the same concentration and in the same amounts as in Example 1, and solution No. I the same except that it was initially diluted down to a 3% concentration of nickel, as sulfate, the procedure was varied so as to add the solution containing the zirconium and the carbonate (II and III after mixing) to the solution of nickel sulfate.

Solution No. I, diluted to 3% as noted, was brought to a boil and while in this condition the clear solution of II in III, at a temperature of about 80° F., was gradually added through a perforated coil below the surface of solution No. I, the time required for the complete addition being about 30 minutes. The boiling of the combined solutions, now containing the precipitated carbonates, was continued for 5 more minutes, whereupon the slurry was filtered, and the precipitate was washed, dried, and reduced as in Example 1.

The resulting catalyst was fully as active as that of Example 1 and had very good re-use characteristics.

In the practice of the invention the following conditions should be observed for favorable results:

The concentration of nickel in solution No. I should be below 12 per cent, and preferably not above 4 per cent.

The concentration of sodium carbonate in solution III may vary rather widely, but is preferably between 7 per cent and 15 per cent.

The weight ratio of nickel to zirconium is preferably not over 10 to 1. Not much is gained, at least when the cost factor is taken into account, by going below a ratio of 3 to 1.

The amount of carbonate employed, in the form of any alkali carbonate or bicarbonate, should be at least 95 per cent of the theoretical requirement, or enough to bring the pH of the final slurry up to at least 8.2; or stated differently the amount of nickel salt used should not be enough to reduce the pH of the final slurry below 8.2. In order to meet this limit when using bicarbonate some boiling is required.

The temperature of solution No. I, at the time of mixing with combined solutions II and III, should be at least 150° F., and preferably as high as 165° F., and may be as high as 300° F. if the mixing operation is conducted under pressure.

The temperature of solutions II and III at the time of mixing should not normally average above 165° F., and the combination of these solutions should not exceed this approximate figure. Zirconium tends to precipitate as a basic derivative at higher temperatures, the exact critical point depending largely upon the amount of bicarbonate present.

The bringing together of solution No. I with the combination of solutions II and III should be performed in a manner such as to minimize occlusion of either solution in flocks of the precipitate.

The total amount of alkali carbonate employed in solution III should be at least 300 per cent (and not normally more than 1000 per cent) of the amount required to form simple zirconium carbonate from the zirconium contained in solution II.

Aside from the foregoing precautions the conditions of the process have not been found to be critical and may be varied widely. I do not limit myself to any particular mode of preparing the clear solution containing both promoter metal and carbonate, as the invention relates broadly to the coprecipitation of carbonate of nickel and promoter metal by the use of such a solution.

Having thus described my invention, what I claim and desire to secure by Letters Patent is:

1. In the production of a nickel-zirconium catalyst, for use in the hydrogenation of carbon to carbon double bonds in unsaturated organic liquids, by co-precipitating insoluble nickel and zirconium compounds from aqueous solutions of soluble salts of these metals, washing and drying the precipitate and subjecting it to a stream of reducing gas at elevated temperature until the product assumes the characteristic black color of reduced nickel catalyst, the steps of forming at a temperature not substantially over 165° F. a mixture from an aqueous solution of a water soluble salt of zirconium, selected from the group consisting of normal salts of zirconium and hydrolysis products thereof, and a large excess of an aqueous solution of a soluble carbonate, and gradually combining this solution with an aqueous solution of a soluble nickel salt, the concentration of nickel in the aqueous solution of nickel salt being less than 12 per cent and the temperature of this solution being at least 150° F. at the time of its combination with the zirconium-carbonate solution, the amount of carbonate employed being sufficient to give the final slurry a pH of at least 8.2.

2. The process of preparing nickel-zirconium catalyst which comprises gradually mixing a dilute aqueous solution of a soluble zirconium salt with an aqueous solution containing at least 3 equivalents of an alkali carbonate at a temperature not substantially above 165° F. and such that the resulting mixture forms a clear solution, gradually mixing said solution with an aqueous solution containing at least three and not over ten parts by weight of nickel, in the form of a soluble salt thereof, per part of zirconium, and not enough nickel salt to reduce the pH of the resulting slurry below 8.2, the temperature of the nickel salt solution being at least 150° F., filtering the resulting coprecipitate of nickel-zirconium carbonate, washing until substantially sulfate free, drying, and reducing by means of hydrogen at 260° to 350° C.

3. The process of preparing nickel-zirconium catalyst which comprises gradually mixing a dilute aqueous solution of zirconium sulfate with an aqueous solution containing at least 3 equivalents of sodium carbonate at a temperature not substantially above 165° F. and such that the resulting mixture forms a clear solution, gradually mixing said solution with an aqueous solution containing not over 12 per cent nickel, as the sulfate, and at least three and not over ten parts by weight of nickel, per part of zirconium, and not enough nickel sulfate to reduce the pH of the resulting slurry below 8.2, the temperature of the nickel sulfate solution being at least about 165° F., filtering the resulting coprecipitate of nickel-zirconium carbonate, washing until substantially sulfate free, drying, and reducing by means of hydrogen at 260° to 350° C.

4. The process of claim 3 in which the concentration of nickel in the aqueous solution thereof is not over 4 per cent.

5. The process of claim 3 in which the concentration of sodium carbonate in the aqueous solution thereof is between 7 per cent and 15 per cent.

6. The process of claim 1 in which the aqueous solution of a nickel salt at a temperature of about 165° F. is sprayed onto the surface of said clear solution also at about 165° F.

7. The process of claim 1 in which the aqueous solution of a nickel salt at a temperature of about 165° F. is sprayed onto the surface of said clear solution also at about 165° F., and in which the resulting precipitate is digested for at least about 45 minutes with gentle agitation and then vigorously boiled for at least about 30 minutes.

HAROLD KENNETH HAWLEY.

REFERENCES CITED

The following references are of record in the file of this patent:

UNITED STATES PATENTS

| Number | Name | Date |
| --- | --- | --- |
| 1,268,692 | Dewar et al. | June 4, 1918 |
| 1,830,010 | Williams | Nov. 3, 1931 |
| 1,959,189 | Woodhouse | May 15, 1934 |
| 1,976,875 | Connolly et al. | Dec. 16, 1934 |
| 2,064,867 | Woodhouse | Dec. 22, 1936 |
| 2,119,566 | Williams | June 7, 1938 |
| 2,378,905 | Bates | June 26, 1945 |
| 2,395,876 | Kearby | Mar. 5, 1946 |
| 2,444,913 | Bond | July 13, 1948 |